United States Patent [19]

Roche

[11] 4,138,596
[45] Feb. 6, 1979

[54] EQUIPMENTS FOR CONNECTING PCM MULTIPLEX DIGITAL TRANSMISSION SYSTEMS HAVING DIFFERENT NOMINAL BIT RATES

[76] Inventor: Alain Y. Roche, 37 Ave. de Lorraine, Ker Huel Lannion, France, 22300

[21] Appl. No.: 825,679

[22] Filed: Aug. 18, 1977

[30] Foreign Application Priority Data

Sep. 2, 1976 [FR] France ............................ 76 26950

[51] Int. Cl.² .............................................. H04J 3/00
[52] U.S. Cl. ........................... 179/15 BV; 179/15 BA
[58] Field of Search ........ 179/15 BV, 15 AT, 15 AF, 179/15 AQ, 15 BS, 15 BA, 15 A, 15 AC; 178/50

[56] References Cited

U.S. PATENT DOCUMENTS

| | | | |
|---|---|---|---|
| 3,597,548 | 8/1971 | Drinnan et al. | 179/15 AT |
| 3,766,322 | 10/1973 | Moffett et al. | 179/15 BV |
| 3,862,370 | 1/1975 | Kadota | 179/15 BV |
| 3,982,077 | 9/1976 | Clark et al. | 179/15 BV |

*Primary Examiner*—Thomas A. Robinson
*Attorney, Agent, or Firm*—Charles A. Laff; J. Warren Whitesel; Howard B. Rockman

[57] ABSTRACT

European 30-channel PCM multiplex systems and Anglo-Saxon 24-channel PCM multiplex systems are both standardized in accordance with CCITT recommendations. However they have different nominal binary rates. The connection equipment, according to this invention, provides for connecting a plurality of European PCM multiplex systems with a plurality of Anglo-Saxon PCM multiplex systems. Multiplex words are stored in parallel word memories for two-way transmission in forward and backward directions. Inside the equipment, parallel word write and read operations are performed at predetermined times, corresponding to some selected Anglo-Saxon PCM multiplex system bit times. Write and read parallel word memory addresses are determined by means of a control memory that is read in synchronism with Anglo-Saxon PCM multiplex system bit rate.

More generally the equipment enables different types of PCM multiplex networks to be interconnected. That is particularly useful for providing a time-division switching center, initially designed for switching a PCM multiplex of one type, within a network using a PCM multiplex of the other type.

6 Claims, 12 Drawing Figures

EQUIPMENTS FOR CONNECTING PCM MULTIPLEX DIGITAL TRANSMISSION SYSTEMS HAVING DIFFERENT NOMINAL BIT RATES

The present invention relates to an equipment for connecting pulse code modulation (PCM) multiplex digital transmission systems, having different nominal bit rates. In the following description with the aim at simplifying the description, a PCM multiplex digital transmission system will more simply be called "PCM multiplex systems".

Presently, according to recommendations G 732 and G 733 of the CCITT, two types of PCM multiplex systems are standardized. The first type is the so-called European PCM multiplex system with either 30 or 31 channels which are transmitted within a time frame having a duration of 125 microseconds, which are divided in 32 time slots of 3.9 microseconds each. Each time slot is divided in 8 sub-slots or elementary times. Each elementary time slot is used for transmitting only a bit having a duration of 490 nanoseconds. Within a frame, the time slots are numbered from 0 to 31. Time slots 1-15 and 17-31 are respectively assigned to 30 telephone channels. Time slot 0 either contains the frame alignment signal, made of bits 0011011 preceded by a first bit 1, or an alarm signal wherein the second bit is 1. This second bit 1 makes it different from the frame alignment signal. Time slot 16 is currently assigned to channel associated signalling. Each time slot 1-15 or 17-31 contains the 8 bits of a telephone channel which correspond to the pulse code modulation of that channel. There is a sampling rate of 8,000 samples per second and a so-called A-law encoding law. The frames are grouped in multiframes. Each multiframe comprises 16 consecutive frames numbered from 0 to 15. Time slot 16 of the frame 0 in a multiframe contains the multiframe alignment signal. Finally, each time slot 16 in frames 1-15 contains signalling data for two telephone channels.

The second standardized PCM multiplex system is the Anglo-Saxon PCM multiplex system with 24 channels within a time frame having a duration of 125 microseconds. This time frame is divided into 24 time slots of 5.2 microseconds each, plus an elementary time that contains a bit. This bit may provide for either the frame alignment or the multiframe alignment, or a part of signalling data. Each time slot is divided in 8 sub-slots or elementary times, each transmitting only a single bit and having a duration of 650 nanoseconds. Within a frame the time slots are numbered from 1 to 24, each time slot being respectively assigned to a telephone channel and containing the 8 bits corresponding to the PCM modulation of that channel. With a sampling rate of 8,000 samples per second, there a so-called $\mu$-law encoding law. The frames are grouped in multiframes, each multiframe comprising 12 consecutive frames numbered from 1 to 12. With a channel associated signalling, the eighth bit of each time slot in frames 6 and 12 is not a bit transmitting the telephone channel associated with that time slot, but is a bit for transmitting signalling data concerning that channel.

A purpose of the present invention is to provide a connection equipment for making it possible to interconnect a plurality of PCM multiplex systems of the first mentioned type and a plurality of PCM multiplex systems of the second type.

It is already known to interconnect a plurality of PCM multiplex systems of the same type, particularly through a use of time-division telephone switching systems. However, in those systems, all of the channels to be switched have the same duration.

With respect to the two types of PCM multiplex systems to be connected through the equipment according to this invention, it must be noted that only the sampling frequencies of 8,000 Hz are identical which results in a common frame duration of 125 microseconds for both types of systems. On the contrary, they are different when considering the numbers of channels in each frame; or, otherwise said, there are different durations for the time slots. Furthermore they still differ in signalling transmission procedures.

In the following, with the aim at making the description simpler, the European 30-channel PCM multiplex system will be indicated as multiplex system a, and every data relative to such a multiplex system a will be indicated by an alphanumeric reference followed by the suffix letter a. Thus time slots 0-31 in a frame will be indicated by ta0, ta1, . . ., ta31. In a time slot, the eight bit times will be indicated by ua1, . . ., ua8. In a frame, a bit time will be indicated by taiuaj, i varying from 0 to 31 and j varying from 1 to 8. In a similar manner, data relative to an Anglo-Saxon 24-channel PCM multiplex system or multiplex system b will be indicated by an alphanumeric reference followed by the suffix letter b. Thus time slots 1-24 in a frame will be indicated by tb1, tb2, . . ., tb24. In a time slot, the eight bit times will be indicated by ub1, . . ., ub8. In a frame, a bit time will be indicated by tbiubj, i varying from 1 to 24 and j varying from 1 to 8. However the last time bit in a frame will be indicated by S when it does not contain the frame alignment signal.

According to a feature of the present invention, there is provided an equipment for connecting a plurality of multiplex systems a to a plurality of multiplex systems b. Both multiplex systems a and b have the same sampling frequency. A channel in a multiplex system a is associated with a predetermined channel in a multiplex system b in the plurality of multiplex systems b. Each multiplex system a or b has two transmission directions called "forward" when the transmission is from a multiplex system a to a multiplex system b, and "backward" in the reverse direction. The connecting equipment comprises, at the end of each multiplex system a, a first forward terminal and a first backward terminal and, at the end of each multiplex system b, a second backward terminal and a second forward terminal. Each first forward terminal is connected to a first serial-parallel word converter connected to the input of a first parallel word memory and a first time slot counter whose output is connected to write addressing input of the first parallel word memory. Each first backward terminal is connected from a first parallel-serial word converter connected from the output of a second parallel word memory. Each second forward terminal is connected from output of a second parallel-serial word converter. Each second backward terminal is connected to a first serial word memory whose output is connected to a second serial-parallel converter. Outputs of the first parallel word memories are selectively connected, through a forward code converter, to the second parallel-serial word converters at first predetermined times. Inputs of the second parallel word memories are selectively connected, through a backward code converter, to the second serial-parallel word converters at the same first predetermined times. At each first predetermined time, the connected first parallel word memory and the connected second parallel word memory are associated with the same multiplex system a on the one hand. The connected second parallel-serial word converter and the connected second serial-parallel word converter are associated with the same multiplex system b, on the other hand. The first predetermined time periods correspond to bit times in a frame of multiplex system b. Each first predetermined time period corresponds to a read addressing of a first parallel word memory and a write addressing of a second parallel word memory as well as a selection of a second parallel-serial word converter and a second serial-parallel word converter. The parallel words delivered from a first serial-parallel word converter and from a second parallel word memory at second predetermined times correspond to bit times in a frame of multiplex system b.

According to another feature, each first serial-parallel word converter is also connected to the input of a third parallel word memory. Each time slot counter is connected to a frame counter whose output is connected to the write addressing input of the said third parallel word memory. The data input of the third parallel word memory is only validated when the count stored in the time slot counter reaches a predetermined value. The third parallel word memory may possibly be read bit by bit at third predetermined time periods, selected from the first predetermined time periods, the bit read at each read operation from the third parallel word memory is substituted for a bit of the word read, at the same first predetermined time period, from the first parallel word memory.

According to another feature, each first parallel-serial word converter is also connected from the output of a fourth parallel word memory arrangement in a same manner as the third parallel word memory is connected. Data may possibly be written into the fourth parallel word memory bit by bit at fourth predetermined time periods selected among the first predetermined times. The parallel words are read from the fourth parallel word memory at fifth predetermined time periods selected among the said second predetermined times. The data applied to the fourth parallel word memory are parts of the parallel words applied to the second parallel word memory.

According to another feature, the forward code converter includes, parallel connected from its input to its output, a direct wire for transmitting the least significant bit of the applied parallel word. A first converting memory receives the other bits of the applied parallel word and delivers the other bits of the converted word, except at sixth predetermined time periods which correspond to the bit times of a frame of multiplex system b are different from those corresponding to the first and second predetermined times. A decoder delivers a two-condition binary information to a flip-flop during the said sixth predetermined times, the binary information depending on the word applied to the forward code converter. The flip-flop output delivers some of the bits S to be transmitted through the multiplex system b, whose second forward terminal is connected to the forward code converter at the considered time.

According to another feature, the backward code converter includes, parallel connected from its input to its output, a direct wire for transmitting the least significant bit of the applied parallel word. A second converting memory receives the other bits of the applied parallel word and delivers the other bits of the converted word, except at seventh predetermined time periods which are similar or identical to the sixth predetermined time periods. An encoder receives some of the bits S transmitted from that multiplex system b, whose second backward terminal is connected to the backward code converter, at the considered time, and delivering the other bits of the converted parallel word.

According to another feature, read addresses of the first parallel word memories and write addresses of the second parallel word memories are delivered from a control memory whose read addresses are derived from the first predetermined times.

The above mentioned features of the present invention, as well as other features, will appear more clearly from the following description of embodiments, the description being made in conjunction with the accompanying drawings, wherein.

Figure 1:
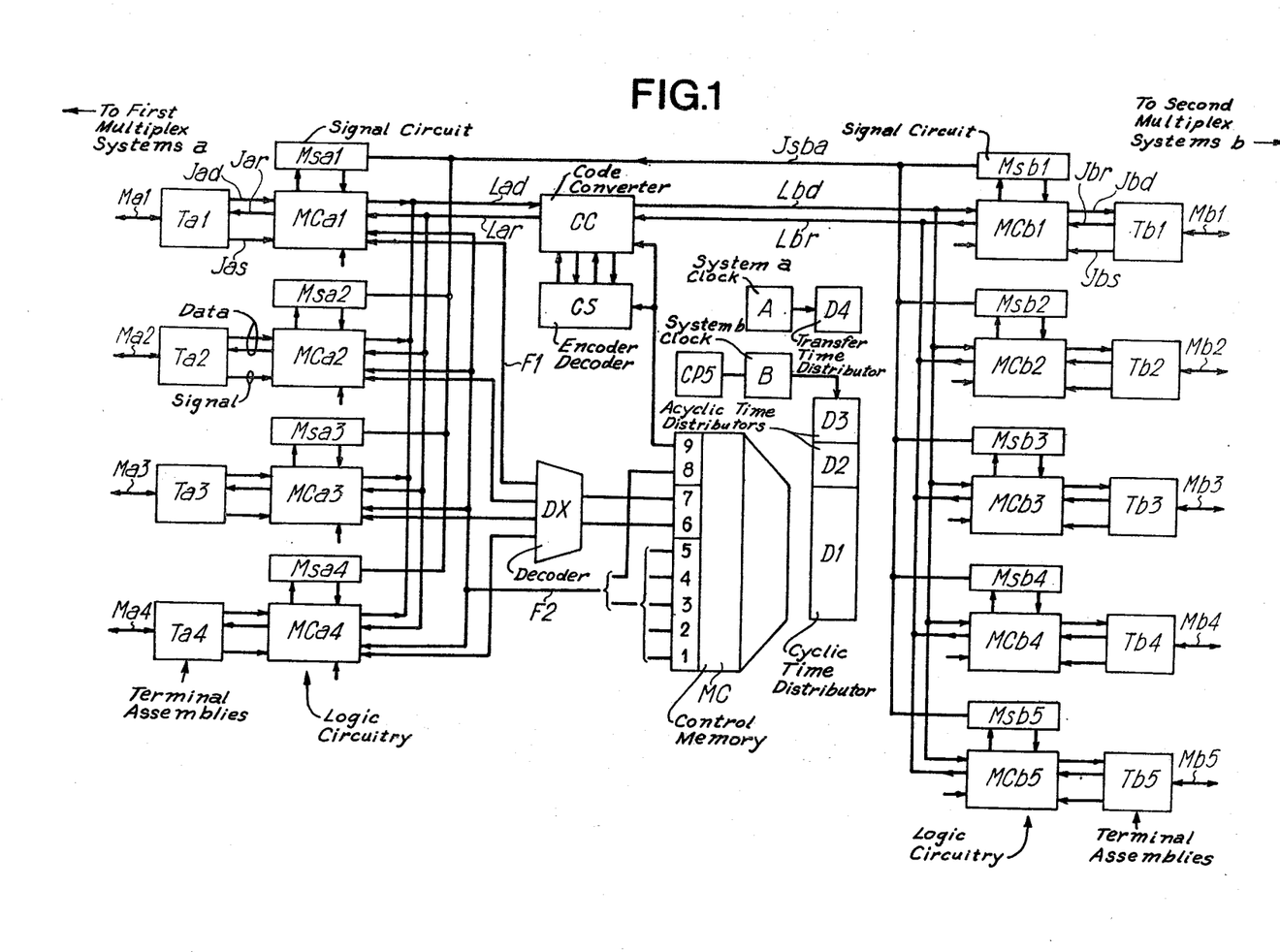
FIG. 1 is a block-diagram representation of a first embodiment of a connection equipment according to this invention.

The connection equipment, shown in FIG. 1, is designed for connecting four multiplex systems Ma1-Ma4 to five multiplex systems Mb1-Mb5. Multiplex systems Ma1-Ma4 have their ends respectively connected to terminal assemblies Ta1-Ta4. Terminal assemblies Ta1-Ta4 are respectively connected to memory-converter assemblies MCa1-MCa4. On the other hand, multiplex systems Mb1-Mb5 have their ends respectively connected to terminal assemblies Tb1-Tb5. Terminal assemblies Tb1-Tb5 are respectively connected to logic circuitry assemblies MCb1-MCb5. Each link between a terminal assembly Ta1-Ta4 and its associated memory-converter assembly MCa1-MCa4 comprises a forward data junction Jad, a backdata junction Jar and a forward signalling junction Jas. Each link between a terminal assembly Tb1-Tb5 and its associated logic circuitry assembly MCb1-MCb5 comprises a forward data junc-

TABLE 2

| Frame number | Frame alignment signal | Multiframe alignment signal | Bit assignment in time slot words | |
|---|---|---|---|---|
| | | | Channel signal | Signalling |
| 1 | 1 | | ub1-ub8 | |
| 2 | | 0 | ub1-ub8 | |
| 3 | 0 | | ub1-ub8 | |
| 4 | | 0 | ub1-ub8 | |
| 5 | 1 | | ub1-ub8 | |
| 6 | | 1 | ub1-ub7 | ub8 |
| 7 | 0 | | ub1-ub8 | |
| 8 | | 1 | ub1-ub8 | |
| 9 | 1 | | ub1-ub8 | |
| 10 | | 1 | ub1-ub8 | |
| 11 | 0 | | ub1-ub8 | |
| 12 | | 0 | ub1-ub7 | ub8 |

Figure 4:
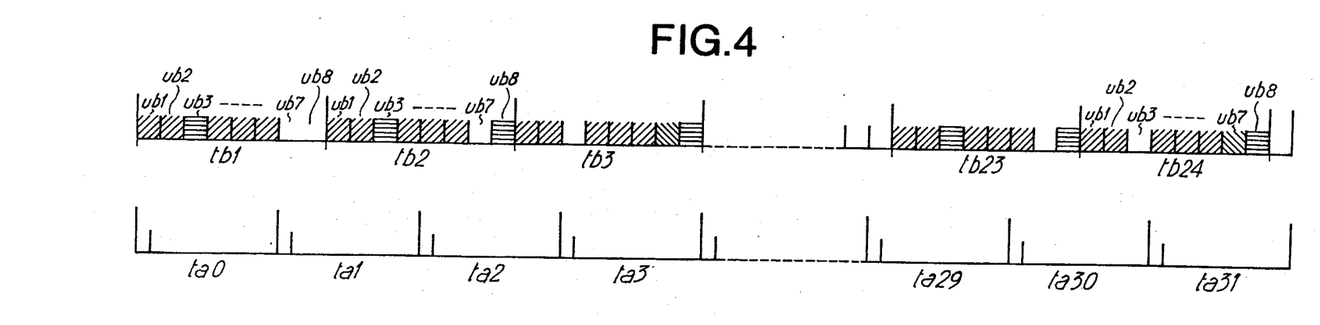
FIG. 4 depicts a time diagram illustrating the operation of the equipment, shown in FIG. 1, and particularly the various groups of operation times in that equipment.

FIG. 4 shows the relative positions of the time slots and the bit times in both multiplex systems a and b. The frames thereof are assumed to be synchronous. From FIG. 4 it appears that three bit times ub and four bit times ua have roughly the same duration and differ only by 80 nanoseconds.

By way of example, it will be assumed that the equipment shown in FIG. 1 is capable of connecting four European multiplex systems a (with 30 telephone channels) to five Anglo-Saxon multiplex systems b (with 24 telephone channels). Thus, every 125 microseconds, the equipment must process 120 channels. Between memory-converter assemblies MCa1-MCa4 and logic circuitry assemblies MCb1-MCb5, every channel binary word is transmitted in a parallel mode through junctions Lad and Lbd, in the forward direction, and through junctions Lbr and Lar, in the backward direction. Data transfers through those bus junctions at the rate of the b-multiplex system bit rate. In other words, the b-multiplex system bit time periods serve as clock times for those bus junctions. Thus, there are 193 available clock time periods, per frame, among which 120 clock times are assigned to transferring channel words in a parallel mode. In FIG. 4, those transfer times are indicated by squares hatched with oblique lines that inclined upwardly from the lower left toward the upper right. In each time slot tbi, five transfer times are provided which correspond to the channel words to be transfered in succession either into or out of the five assemblies CLb1-CLb5. As indicated in the hereafter Table 3, each transfer time determines the address of the concerned word in the multiplex system b.

TABLE 3

| Transfer time | Work address in multiplex systems b |
|---|---|
| tb1ub1 | Mb1, channel 2 |
| tb1ub2 | Mb2, channel 2 |
| tb1ub4 | Mb3, channel 2 |
| tb1ub5 | Mb4, channel 2 |
| tb1ub6 | Mb5, channel 2 |
| tb2ub1 | Mb1, channel 3 |
| tb2ub2 | Mb2, channel 3 |
| tb2ub4 | Mb3, channel 3 |
| tb2ub5 | Mb4, channel 3 |
| tb2ub6 | Mb5, channel 3 |
| tbiub1 | Mb1, channel i + 1 |
| tbiub2 | Mb2, channel i + 1 |
| tbiub4 | Mb3, channel i + 1 |
| tbiub5 | Mb4, channel i + 1 |
| tbiub6 | Mb5, channel i + 1 |
| tb24ub1 | Mb1, channel 1 |
| tb24ub2 | Mb2, channel 1 |
| tb24ub4 | Mb3, channel 1 |
| tb24ub5 | Mb4, channel 1 |
| tb24ub6 | Mb5, channel 1 |

At a given transfer time, the address of the concerned word in a multiplex system a is delivered from control memory MC. Practically, control memory MC is a permanent or semi-permanent memory that selects a word in a multiplex system a when it is addressed from distributor D1 at a transfer time as defined in Table 3. Such a selection is performed in the memories includes in assemblies MCa1-MCa4 and Msa1-Msa4.

Figure 5:
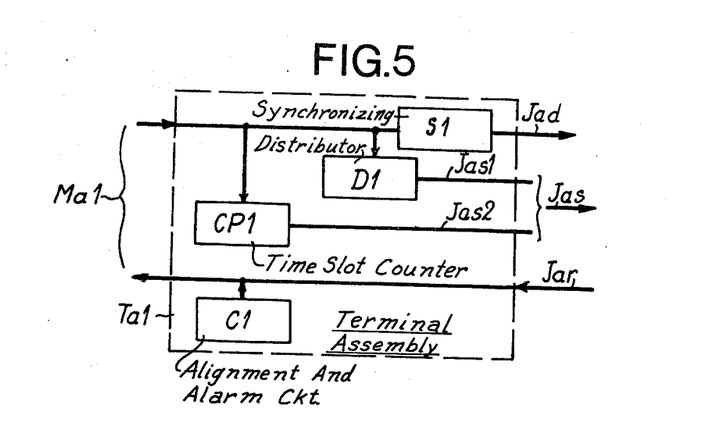
FIG. 5 is a block-diagram representation of an assembly of forward and backward terminals associated with a multiplex system a, FIG. 6 is a schematic representation of an assembly of memories associated with the assembly of terminals, shown in FIG. 5.

With reference to FIG. 5, a terminal assembly of a multiplex system a will now be described, that for instance is assembly Ta1. In assembly Ta1, an ingoing junction of multiplex system Ma1 is connected to a synchronization circuit S1 whose output is directly connected to junction Jad, on the one hand, and to a failure detector circuit D1 whose output is connected to wire Jas1 of Junction Jas, on the other hand. A time slot counter circuit CP1 whose output is connected to wire Jas2 of Jas, finally. Synchronizing circuit S1 performs a frequency adjustment operation and phase equalizing operation. Circuit S1 transmits at the rate determined by internal clock A, via junction Jad. The bits are received from the ingoing junction at the bit rate of multiplex system Ma1. It is enough to provide phase equalization to the octets of 8 bits. The 8 bits corresponding to a digital channel j are transmitted to junction Jad in only one time slot tai, indices i and j being not compulsory equal to each other. The circuits S1, D1 and CP1 are well known in the art. Ingoing junction matching is also performed in a conventional manner in a circuit, not shown, located in the terminal. By way of example, a description of a terminal of this type is given in the French Patent Application No. 2,256,606 filed in the name of the Applicant. Outgoing junction of Ma1 is connected from junction Jar. A circuit C1 inserts during time slot ta0 the frame alignment signals and failure alarm signals in accordance with the established standards. Outgoing junction matching is performed in a conventional manner by a circuit, not shown, located in the terminal.

Figure 6:
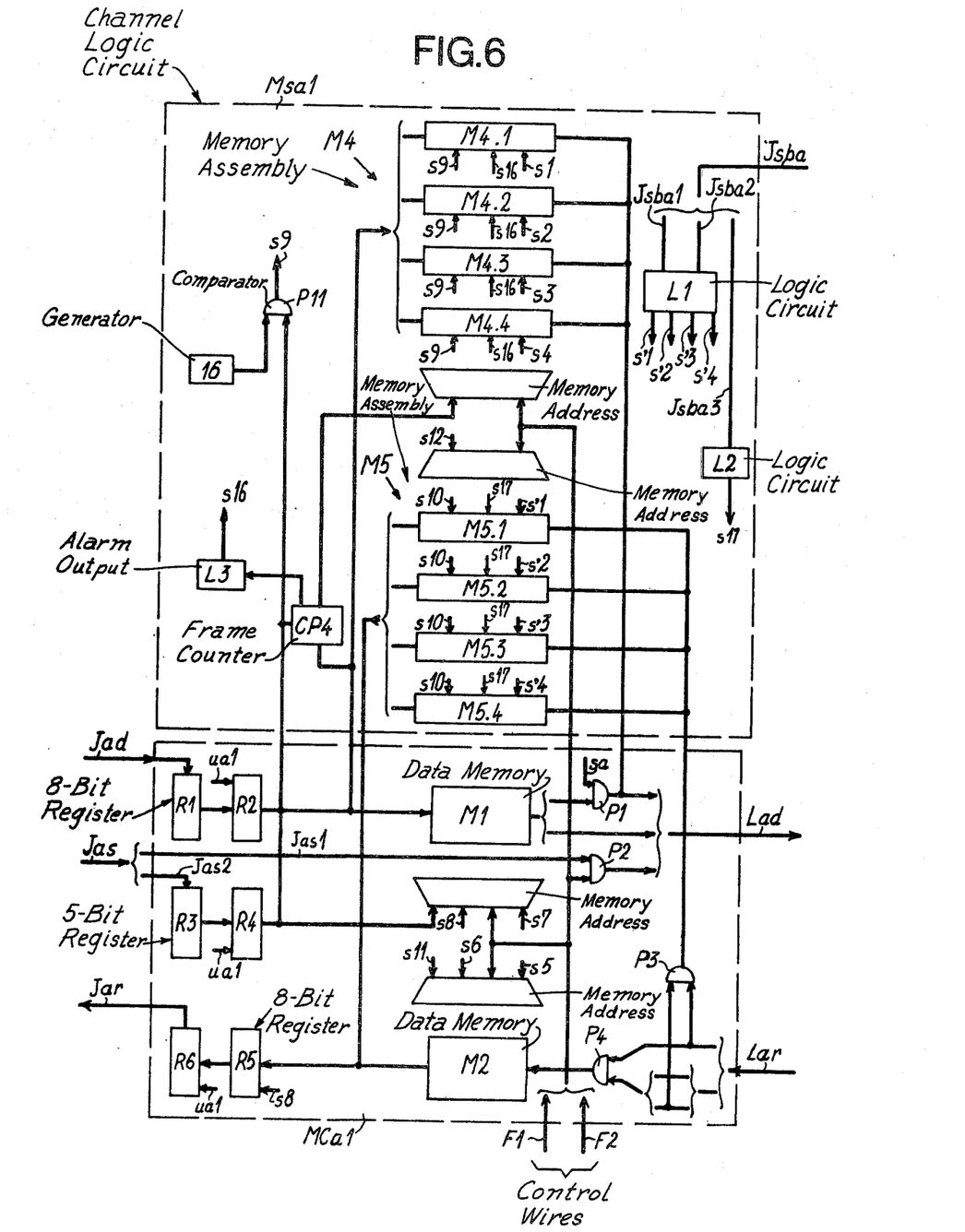

In assembly MCa1, shown in FIG. 6, junction Jad is connected to the serial input of a 8-bit register R1 whose parallel output is connected to the parallel input of a register R2 whose parallel output is connected to the data input of a 8-bit 32-word memory M1. The seven data output wires of memory M1 corresponding to the most significant bits in a channel word are directly connected to seven wires of junction Lad. The output wire corresponding to the least significant bit is connected to the first input of an AND gate P1 whose output is connected to the eighth wire of junction Lad. The wire Jas1 in Jas is connected to the first input of an AND gate P2 whose output is connected to the ninth wire of junction Lad. The wire Jas2 is connected to the serial input of a 5-bit register R3 whose parallel output is connected to parallel input of a 5-bit register R4 whose parallel output is connected to the write addressing input of memory M1.

tion Jbd, a backward data junction Jbr and a forward-backward signalling junction Jbs.

Memory-converter assemblies MCa1-MCa4 are parallel connected to a code converter CC-CS through a forward bus junction Lad and a backward bus junction Lar. On the other hand, logic circuitry assemblies MCb1-MCb5 are parallel connected to code converter CC-CS through a forward bus junction Lbd and a backward bus junction LbR. The code converter CC converts data received, via Lad, from multiplex systems Ma1-Ma4 into data transmitted, via Lbd, to multiplex systems Mb1-Mb5, in the forward direction, and data received, via Lbr, from multiplex systems Mb1-Mb5 into data transmitted, via Lar, to multiplex systems Ma1-Ma4.

To each memory converter assembly MCa1-MCa4 respectively associated is a signalling memory assembly Msa1-Msa4 with which it exchanges data in both directions. To each logic circuitry assembly MCb1-MCb5 respectively associated is a signalling circuit Msb1-Msb5 with which it exchanges data in both directions. Signalling memory assemblies Msa1-Msa4 are parallel connected to the output of a bus junction Jsba while signalling circuits Msb1-Msb5 are parallel connected to the input of a bus junction Jsba.

To code converter CC associated is a special encoder-decoder CS dealing with peculiar signalling problems, as hereafter described.

The connection equipment comprises a clock A defining the equipment bit times of multiplex systems a. A clock B defines the equipment bit times of multiplex systems b. The remaining equipment cyclic time distributor D1, a first acyclic time distributor D2, a second Output wires F2 from memory MC, for transmitting bits 1-5, as well as bit 8, are multipled to corresponding control inputs of assemblies MCa1-MCa4 and Msa1-Msa4. Output wires for transmitting bits 6 and 7 are connected to a decoder DX whose output wires are respectively connected to corresponding control inputs of assemblies MCa1-MCa4 and Msa1-Msa4. The output wire for transmitting bit 9 is connected to an input of CC-CS. In FIG. 1, control inputs are symbolized by arrow head directed into a box and transmit logic signals derived from those signals delivered from flock B and time distributor D1-D3, as it will appear more clearly in the following in relation with descriptions of detailed circuitry.

Figure 2:
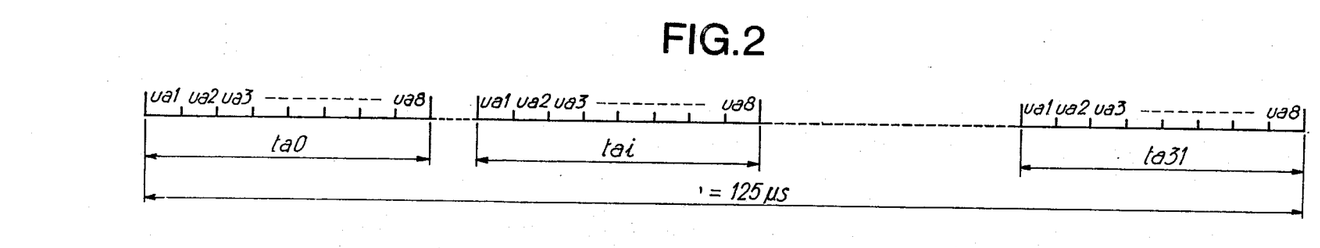
FIG. 2 depicts the structure of a frame in a multiplex system a, FIG. 3 depicts the structure of a frame in a multiplex system b.

In illustrating the operation of the equipment shown in FIG. 1, an assumption is made that multiplex systems a are European multiplex systems while multiplex systems b are Anglo-Saxon multiplex systems. The characteristics thereof have been hereabove summarized. FIG. 2, depicts a European multiplex system time scale for a frame having a duration of 125 microseconds and comprising 32 time slots ta0-ta31, each time slot including 8 bit times ua1-ua8. In each bit time, information is represented by a bit "0" or a bit "1". The 8 bits included in a time slot form a binary word corresponding to a telephone channel either transmitted in the forward direction or the backward direction. In each frame, time slot ta0 either contains the frame alignment signal or service signals. In addition, a multiframe comprises 16 consecutive frames. In the following, an assumption will be made that signalling is implemented channel by channel by using time slot 16 in each frame, as indicated in the following Table 1.

TABLE 1

| No. of the frame | 0 | | 1 | | | 2 | | ... |
|---|---|---|---|---|---|---|---|---|
| Assignment of the bits in the binary word | 0000 xyxx | abcd channel 1 | abcd channel | 16 | abcd channel 2 | abcd channel | 17 | ... |
| No. of the frame | ... | | 14 | | | 15 | | |
| Assignment of the bits in the binary word | ... | abcd channel 14 | abcd channel | 29 | abcd channel 15 | abcd channel | 30 | | acyclic time distributor D3 and a transfer time distributor D4. Clocks A and B have the same basic frequency and may be synchronized by a signal from outside. In the following, to the extent the description needs it, cyclic times, acyclic times and transfer times will be determined. Distributors D1-D3 are supplied with signals from clock B while distributor D4 is supplied with signals from clock A. Output signals from distributor D1 are, among other uses, utilized as read addressing signals in control memory MC that delivers 9-bit binary words in the described embodiment. The 9 bits of each word delivered from MC are indicated by MC1, MC2, ..., MC9; wherein MC1 is the least significant bit. Their meaning is given in the following table.

Table 0

MC1-MC5: coded channel number in a multiplex system a

MC6-MC7: coded number of the multiplex system a (from 1 to 4)

MC8 = 1: an out-of-band signalling channel is associated with the 64-kbit/s channel MC9 = 1: the channel is to be processed in the code converter.

Values of bits x are determined according to conventions which are beyond the scope of this invention. Bit y is used to indicate a loss of multiframe alignment. Like bits x, bits c and d are determined according to conventions. Only bits a and b carry information regarding signalling. It is to be noted that each time slot 16 of frames 1-15 carries signalling information concerning two telephone channels.

Figure 3:
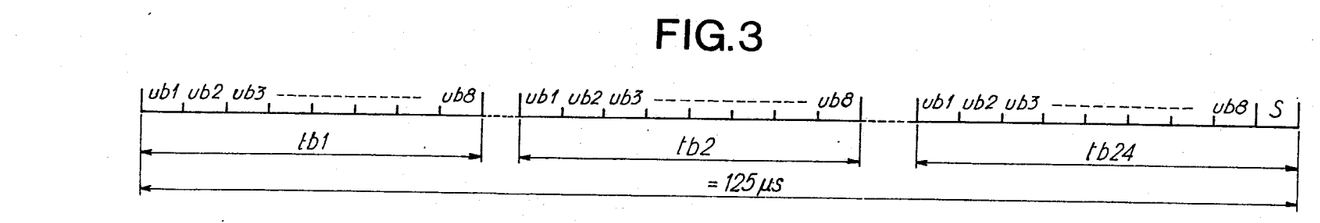

FIG. 3, depicts an Anglo-Saxon multiplex system frame having a duration of 125 microseconds which comprises 24 time slots tb1-tb24, each time slot including 8 bit times ub1-ub8. In each bit time information is represented by a bit "0" or a bit "1". The 8 bits includes in a time slot form a binary word corresponding to a telephone channel which transmits in either the forward direction or the backward direction. For reaching the 125 microseconds, a bit S is added after tb24 in each frame. Such a bit S is either used as a frame alignment signal, or a multiframe alignment signal of for signalling purpose. A multiframe or superframe comprises 12 frames. Channel signalling is transmitted as indicated in the hereafter Table 2, which also indicates assignments for bit S.

When entering logic MCa1, backward junction Lar comprises nine wires having the ninth wire connected apart from the eight other wires. This ninth wire carries a possible alarm signal. The eighth wire, carrying the least significant bit in a channel word, is also set apart to be connected to the first input of an OR gate P3, then set back together with the seven other wires to be connected with them to the first inputs of OR gates P4. The ninth wire is connected in parallel to the second inputs of OR gates P3 and P4. Outputs of the eight OR gates P4 are connected to data parallel inputs of the 8-bit 32-word memory M2. Data output of memory M2 is connected to the parallel input of a 8-bit register R5 whose parallel output is connected to parallel input of a 8-bit register R6 whose serial output is connected to junction Jar.

Read addresses for memory M1 and write addresses for memory M2 are received via a control wire F1 from decoder DX and six control wires F2 from MC as hereabove mentioned. Read addresses for memory M2 are applied from the transfer time distributor D4 transmitting the time slot numbers of the outgoing multiplex system a.

The operation of assembly MCa1 will now be described first in considering the forward transmission direction. Bits transmitted from terminal Ta1, via junction Jad are stored in register R1 from which they are extracted, at time ua1 of each time slot of multiplex system a, and transferred toward register R2 wherein they form the channel word preceding each time ua1. For that purpose, the control input of register R2 is connected from distributor D4 for delivering control signal ua1 from clock A. Each word thus written into register R2 is stored in memory M1 at a frame time of multiplex system b. The write times are employed, as indicated in the hereunder Table 4. The number of the channel stored in memory M1 is contained in register R4.

TABLE 4

| |
|---|
| tb1ub3 |
| tb2ub3 |
| tb2ub8 |
| tb3ub8 |
| tb4ub3 |
| tb5ub3 |
| tb5ub8 |
| tb6ub8 |
| tb3 j+1 ub3 |
| tb3 j+2 ub3 |
| tb3 j+2 ub8 |
| tb3 j+3 ub8 |
| tb22ub3 |
| tb23ub8 |
| tb24ub8 |

It is to be noted that these time periods cyclically appear during each period of 3 time slots of multiplex system a. There are 4 of these time period in a period of 3 time slots. In the following these times will be indicated by cyclic times.

In addition, the time slot number of multiplex system a that has been transmitted through Jas2 is stored in register R4 at the same time qa1 as the channel word corresponding to that number is stored in register R2. The output of register R4 determines the address at which the word must be written in memory M1 at the corresponding cyclic time, according to Table 4.

TABLE 5

| Validation signals | Signals from D2 and D3 | Signals from D4 | Signals from memory MC | Signals from Jsba | Local signals |
|---|---|---|---|---|---|
| s0 | frame 6 . Frame 12 | | +MC8 | | |
| s1 | Acyclic times . Frame 6 | | . F1 . MC8 . $\overline{MC5}$ | | |
| s2 | Acyclic times . Frame 12 | | . F1 . MC8 . $\overline{MC5}$ | | |
| s3 | Acyclic times . Frame 6 | | . F1 . MC8 . MC5 | | |
| s4 | Acyclic times . Frame 12 | | . F1 . MC8 . MC5 | | |
| s'1 | Acyclic times | | . F1 . MC8 . $\overline{MC5}$ | Frame 6 | |
| s'2 | Acyclic times | | . F1 . MC8 . $\overline{MC5}$ | Frame 12 | |
| s'3 | Acyclic times | | . F1 . MC8 . MC5 | Frame 6 | |
| s'4 | Acyclic times | | . F1 . MC8 . MC5 | Frame 12 | |
| s5 | Acyclic times | | . F1 | | |
| s6 | Acyclic times . (x) | | | | |
| s7 | Acyclic times | | . F1 | | |
| s8 | Acyclic times | | | | |
| s9 | Acyclic times | | | | |
| s10 | Acyclic times tb12 | . $\overline{Frame\ 0}$ | | | |
| s11 | Number of time slots a | | | | |
| s12 | Number of frames a | | | | |

Indeed a signal s8 is provided as a write validation signal. This signal has been made only for convenience because, as will appear in the following, certain write or read validation signals comprise the transfer times indicated in Table 3 or cyclic times indicated in Table 4. These signals result from a logic combination of one of those times with other logic condition signals, the meaning of which will be described in the following specification. Those validation signals s0 - s12 are indicated in the hereabove mentioned Table 5.

In Table 5, the notation "F1" means that wire F1 is activated, i.e. operations are validated in the concerned assembly MCa1 - MCa4; notation "R=16" means that the contents of register R4 are equal to 16; signal x is the time signal tb12, if multiplex system Mai includes associated signalling, if not x = 1 permanently. The value of x may be determined by the user — individually for multiplex system a — by means of wiring straps or any other device of the same kind.

Considering again the writing of the contents of register R2 into memory M1, it appears that such a writing operation occurs at s8, i.e. for each cyclic time of Table 4, whatever the considered assembly MCa1 - MCa4 is. As soon as the word is written into memory M1, it may remain stored for a maximum duration of a time frame. It is read at a transfer time or acyclic time s7 when assembly LCa1 is selected by a signal wire F1. Of course, bits MC1 - MC5 are delivered from control memory MC and transmitted via wires F2 then form the address of the considered word in memory M1. The word is then directly transmitted via wires Lad, save when signal s0, Table 5, is absent, which inhibits outputs of AND gate P1. The case of signal s0 being absent will be described in the following specification. Presently the assumption is that that signal s0 is present.

Figure 7:
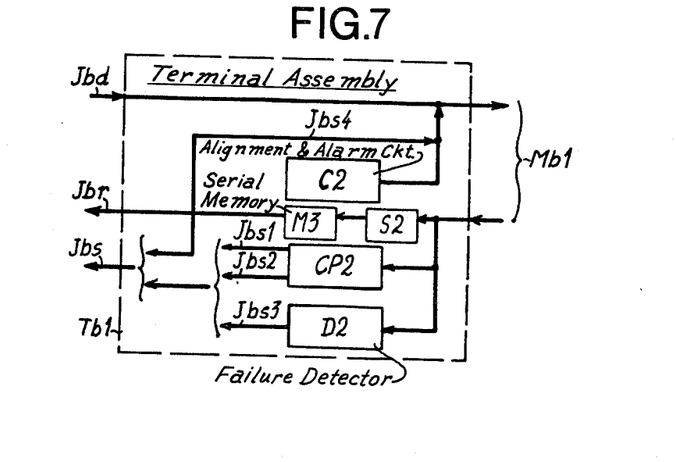
FIG. 7 is a block-diagram representation of an assembly of forward and backward terminals associated with a multiplex system b.

A terminal assembly of a multiplex system b will now be described with reference to FIG. 7, which for instance will be assembly Tb1 in assembly Tb1, junction Jbd is connected to outgoing junction of multiplex Mb1. That outgoing junction is still connected to an output from circuit C2 which generates the bit which provides frame alignment, as indicated in Table 2. Wire Jbs, which may transmit certain bits S carry signalling information as it will be described in the following specification. In order to first simplify the description, an assumption will be made that the bit S carries only alignment information. A matching of the outgoing junction Mb1 is performed in a conventional circuit, not shown in FIG. 7. An ingoing junction of multiplex system Mb1 is connected: on the one hand to a synchronization circuit S2, which identical to circuit S1 in terminal Ta1; whose output is connected to the input of a serial memory M3 whose output is connected to junction Jbr; on the other hand, to a circuit CP2 for delivering (via wire Jbs1) the bit S which is received every two frames and (via wire Jbs2) the parity of the received frame; and finally, to a detector D2 capable of detecting a failure and possibly delivering a failure signal via wire Jbs3. Wires Jbs1-Jbs3 are joined in Jbs. A matching of ingoing junction of Mb1 is performed in a conventional circuit, not shown in FIG. 7. Similar to terminal assembly Ta1, FIG. 5, the circuits in FIG. 7 are conventional in a terminal except that a serial memory M3 is added. The purpose of memory M3 is to synchronize the frame of multiplex system Mb1. Thus the channel having the number i in that multiplex system is automatically transmitted at tb(i-1) via junction Jbr.

Figure 8:
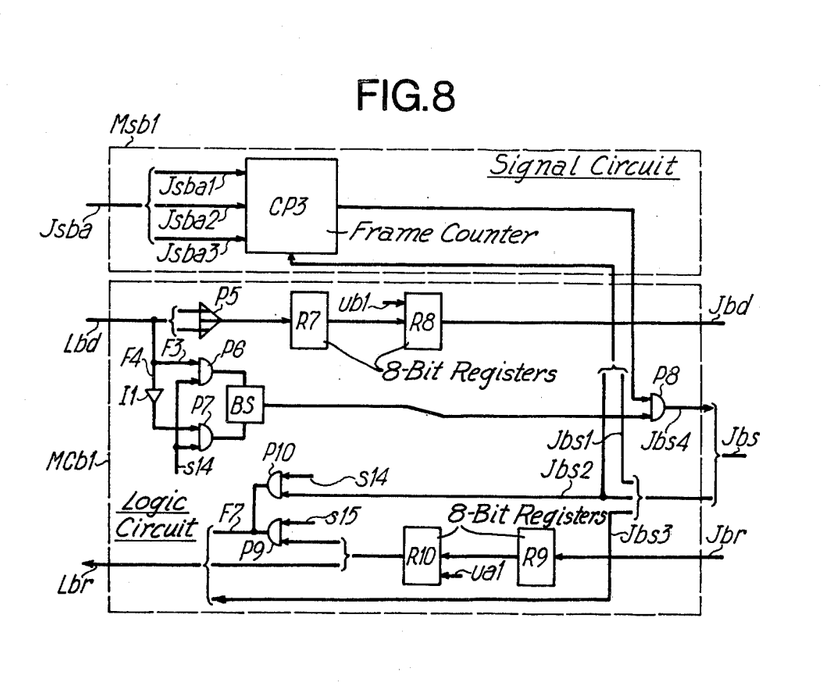
FIG. 8 is a schematic representation of a logic circuitry associated to a multiplex system b.

In assembly MCb1, FIG. 8, the 9-wire junction Lbd is connected to the parallel input of a 8-bit register R7 through OR gates P5 whose one input is connected from the ninth wire for transmitting alarm signals. The other input is connected from a wire for transmitting word bits. Normally, OR gates P5 transmit the word bits without modifying them which will be first assumed. Furthermore, two wires of junction Lbd can transmit signalling bits via channel S in multiplex system b. The first signals F3 are transmitted toward the first input of AND gate P6 and the other one F4 toward AND gate P7, but in this last case through inverter I1. Second inputs of gates P6 and P7 are parallel connected from a control input s14 that is implanted according to Table 7. Outputs of gates P6 and P7 are respectively connected to the two inputs of a flip-flop BS whose output is connected to the first input of OR gate P8 whose output is connected to wire Jbs. A parallel output of register R7 is connected to parallel inputs of 8-bit register R8 whose output is connected to junction Jbd. Bit transfer from register R7 to register R8 is controlled at each bit time ub1 of each time slot. Register R8 is read at the normal bit rate of a multiplex system b.

Junction Jbr is connected to a serial input of an 8-bit register R9 whose parallel output is connected to parallel input of 8-bit register R10. Parallel output of register R10 has seven of its wires directly connected to the corresponding wires of junction Lbr. An eighth wire is connected to the first input of AND gate P9 whose second input is connected from a control input s15 for delivering the signal constituted, as indicated in the following Table 8.

TABLE 8

| MC61 | ub1 |
|------|-----|
| MCb2 | ub2 |
| MCb3 | ub4 |
| MCb4 | ub5 |
| MCb5 | ub6 |

The output of gate P9, and the output of AND gate P10, are connected in parallel to the eighth corresponding wire of junction Lbr. Inputs of gate P10 are respectively connected from wire Jbs2 and a control input s14, which delivers the same signal as to gate P7. Wire Jbs3 is connected to the ninth wire of junction Jbr. Wire Jbs1 is connected to an input of frame counter CP3 whose output is connected to the second input of gate P8. Finally, bit transfer from register R9 to register R10 is controlled at each bit time ub1, as the bit transfer is controlled from register R7 to register R8.

Assuming that flip-flop BS is permanently in condition 0, it permanently allows signals from counter CP3 to pass through gate P8. In addition, each word received from junction Lbd into register R7 is transferred to register R8, and then transmitted in a serial manner via Jbd to terminal assembly Tb1 wherein bit S is added to the 24 channel words, as previously described, by conventional means. In the backward direction, serial words are transmitted via junction Jbr and stored in register R9, before being transferred to register R10.

It must be well understood that the word that enters the register at a given time is the word, possibly converted through code converter CC (FIG. 1), that is read at the same time from the memory M1 (FIG. 6) of one of the assemblies MCa1-MCa4, e.g. MCa1. Thus at read signal s7, a transfer is performed from memory M1 to register R7 according to the address of memory M1 determined by MC, as previously mentioned, the transmission delays through the local circuitry being not taken into account.

Again with reference to FIG. 6, it appears that control signal s5 controls the write operation into memory M2 at the same time that the read operation is performed from memory M1 under control of signal s7, because s5 = 27. Furthermore, wires F1 and F2 parallel determine identical addresses in memories M1 and M2. As the read operation occurs in memory M1 at the same acyclic time as the write operation occurs in memory M2, the result is that the word transmitted at that acyclic time from register R10 is, possibly converted through code converter CC, and stored in memory M2 at an address corresponding to the channel word read from memory M1. The two-way transmission is thus established. In the read operation, the address of a word is determined in memory M2 by a signal s11 delivered by transfer time distributor D4 to define time slot numbers for multiplex system a. The read time is determined by a control signal s6 that corresponds to an activation for each cyclic time period indicated in Table 4, save for time tb12ub8, as hereafter described. Signal 11 is such that the correspondence between the channels and cyclic times is shifted by a unit, such a correspondence being indicated in the following Table 6.

Due to control signal s8, register R5 is switched to the condition which allows it to receive the word read from memory M2. Word transfer from register R5 to register R6 is performed under control of a signal corresponding to each bit time ua1 of the multiplex system a. Then the word is serially read from register R6 to junction Jar.

TABLE 6

| Cyclic times | Backward channel numbers for multiplex system a |
|---|---|
| tb1ub3 | 1 |
| tb2ub3 | 2 |
| — | — |
| tb12ub8 | 16 |
| — | — |
| tb23ub8 | 31 |
| tb24ub8 | 0 |

From the above the equipment shown in FIG. 1 may switch channel words in both directions between 4 multiplex systems a and 5 multiplex systems b. It may also be noted that the time periods in multiplex systems a are only utilized in terminals Tsa1 and registers R4 and R6 of assemblies MCa1-MCa4. All the rest of the equipment is controlled from time periods depending on multiplex systems b.

The signalling memory Msa1 associated with memory-converter assembly MCa1 will now be described. In FIG. 6, the output of register R4 is also connected, on the one hand, to the first input of a comparator P11 and, on the other hand, to the input of a frame counter CP4. The other input of comparator P11 is connected from output of a generator 16 for delivering a binary word of value 16. Output of comparator P11 delivers signal s9, Table 5, that is operative when the contents of a time slot number counter register R4 indicates "16". From Table 1, it is known that, in a multiplex system a, a channel associated signalling is located in time slots 16. The output of word register R2 is also connected, on the one hand, to initializing input of frame counter CP4 and, on the other hand, to data inputs of an assembly M4 of memories M4.1-M4.4. Each memory M4.1-M4.4 may store 16 1-bit words. Each output of a memory M4.1-M4.4 is parallel connected to the output of gate P1 in chemical logic MCa1. Practically, the junction point connecting the output of gate P1 to the outputs of memories M4.1-M4.4 operates as an OR gate. The output of frame counter CP4 is connected to a write addressing input of memories M4.1-M4.4. In addition, frame counter CP4 has an alarm output that is connected to a logic circuit L3 which makes it possible to control memories M4.1-M4.4, as hereafter described, and a second 8-wire parallel output that is connected to the parallel input of register R5. The read addressing input of memories M4.1-M4.4 is connected from wires F1 and F2, as that of memory M1.

The output of gate P3 is parallel connected to the data inputs of four memories M5.1-M5.4 forming an assembly M5. Data outputs of memories M5.1-M5.4, which form the parallel output of assembly M5, are connected to the parallel input of register R5. The write addressing input of memories M5.1-M5.4 is connected from wire F2, as a read addressing input of memories MC4.1-MC4.4. The read addressing input of memories M5.1-M5.4 is determined by control signal s12, Table 5. Wire F1, wires carrying bits MC1-MC5 and MC8, wires Jsba2 of junction Jsba are connected to inputs of a logic circuit L1 which delivers control signals s'1-s'4 indicated in Table 5. Wire Jsba3 is connected to a logic circuit L2 which makes it possible to control the output of memories M5.1-M5.4, as hereafter described. Logic circuits L1, L2 and L3 have a structure known to people skilled in the art in order to get the wished logic results, such as the results of the Boolean functions indicated in Table 5 for obtaining s'1-s'4.

The operation of the channel associated signalling transmission will now be described, first in the forward direction, then in the backward direction. Forward signalling is located in times slots 16 of frames 1-5 of a multiframe in a multiplex system a. When receiving (in MCa1) the frame 0 of a multiframe a, frame counter CP4 is reset by its reset input connected from register R2 which recognizes the multiframe alignment signal. Counter CP4 is stepped by a unit step responsive to each time content in the register R4 which is equal to time slot 16, which is recognized at its data input. At each time slot 16, signal s9 is delivered for validating inputs of memories M4.1-M4.4 with the address indicated in the frame number transmitted from frame counter CP4. Thus, at that time, as indicated in Table 1, bits ab of an odd channel and bits ab of the associated even channel are written into memories M4.1 and M4.2, as far as the odd channel is concerned, and into memories M4.3 and M4.4, as far as the even channel is concerned.

As indicated in Table 2, those bits a and b must be substituted for the least significant bit in each time slot of frames 6 and 12, respectively, in multiplex system b. By way of example, assuming the occurence of frame 6, at acyclic or transfer time tb1ub1, the eight bits determined by the control word MC1-MC5 delivered from control memory MC must be read from memory M1 while the signalling bit must read from one of the memories M4.1 and M4.3. Indeed, bit MC5 identifies, according to its value "0" or "1", which one of the memories M4.1 or M4.3 is to be read out while an address of bit a is derived from bits MC1-MC4. In FIG. 6, practically, the read addressing inputs are multipled on the four memories M4.1-M4.4, but those memories are, in a reading operation, individually validated by signals s1-s4 indicated in Table 5. From Table 5, it further appears that a generation of control signals s1-s4 still depends on the occurence of a bit MC8 which is delivered from the control memory MC (FIG. 1). An assumption is here made that bit MC8 is a "1", the opposite case being to be later considered. Furthermore, as indicated in Table 5, signal s0 is absent or in the "0" condition. Therefore, the output of gate P1 is inhibited with the result that the least significant bit read from memory M1 does pass through gate P1, but the bit read from memory assembly M4 is transmitted via junction Lad.

Regarding the backward direction, for frames 6 and 12 of multiplex system b, logic circuit L1 delivers signals s'4-s'4 which respectively validate inputs of memories M5.1-M5.4 as far as the least significant bits received via junction Lar, through gate P3, are concerned. The write addresses of memories M5.1-M5.4 are, alike for memories M4.1-M4.4 at the same time, and are determined by the control word MC1-MC5 delivered from control memory MC (FIG. 1). Thus, in memory assembly M5 each backward signalling bit is stored in a memory cell similar to the memory cell of assembly M4 that stores the corresponding forward signalling bit. The four memories M5.1-M5.4 are parallel read at each cyclic time tb12ub8 corresponding to channel 16 and a validation signal in accordance with signal s10, Table 5. A read addressing input is determined by signal s12 that corresponds to the frame number in the multiplex system a. The four bits cd are added in a conventional manner to form a word of 8 bits written into register R5, from which it is read out and transferred into register R6, as a current word from memory M2. It is to be noted that the read validation signal s10 regarding assembly M5 is present. In addition, it is to be noted that the read validation signal from assembly M5 is absent during frame O of multiplex system a. During such a frame 0, a parallel output of frame counter CP4 is validated at tb12 and is stored in register R5 accordingly. A parallel output of counter CP4 delivers the multiframe alignement coded signal and alarm information signal, if any, in accordance with the standards. Thus, there is no interference in read operation.

Figure 9:
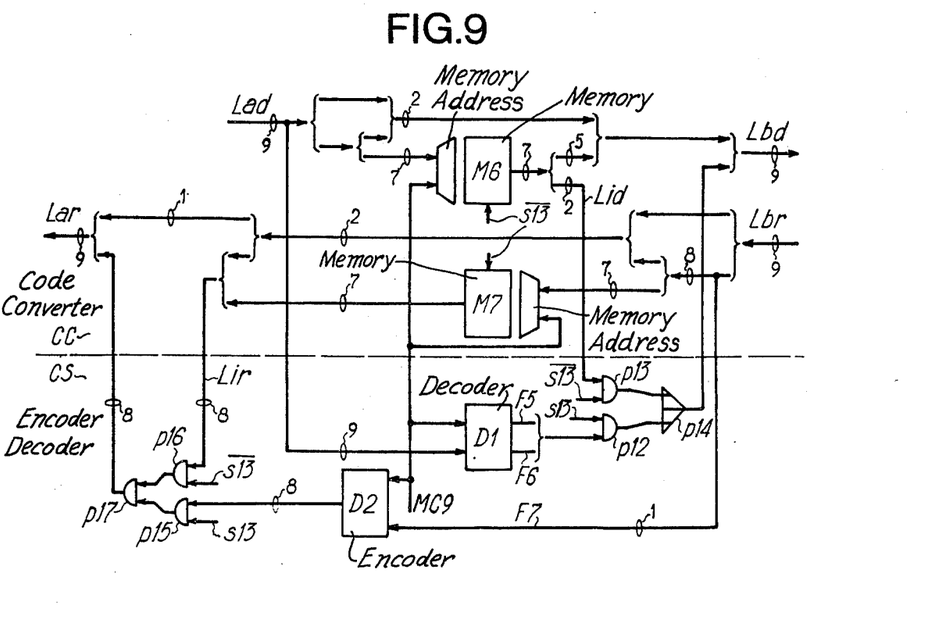
FIG. 9 is a block-diagram representation of a code converter utilized in the connection equipment, shown in FIG. 1.

With reference to FIG. 9, code converter CC will now be described. At input of CC wires of junction Lad are shared into two groups. One group includes the wire transmitting an alarm condition and the wire transmitting the least significant bit. The second group comprises the seven other wires. The second group wires are connected to read addressing inputs of a memory M6 that is a programmable permanent memory whose seven data output wires form junction Lid. The first group wires, as well as five wires of junction Lid, are directly connected to seven wires of junction Lbd. The two remaining wires of junction Lid are each connected to the first input of AND gate P13 whose output is connected to the first input of OR gate P14, whose output is in turn connected to the corresponding free wire in junction Lbd. At their inputs, the CC wires of junction Lbr are also shared into two groups. One group comprises the wire transmitting an alarm condition and the wire transmitting the least significant bit. The second group comprises the seven other wires. Second group wires are connected to read addressing inputs of a memory M7 that is a programmable permanent memory whose seven data output wires are joined to the data wire in the first group to form junction Lir. The alarm wire is directly connected to a corresponding wire in junction Lar. Wires of junction Lir are connected to first inputs of AND gates P16 whose outputs are connected to first inputs of OR gates P17 whose outputs are connected to the other 8 wires in junction Lar.

For instance, memories M6 and M7 are permanent memories of 256 7-bit words among which the 128 last words have the value of their address less 128. The address of a memory M6 or M7 includes the 7 bits transmitted via the respective second group wires, as hereabove mentioned, plus a bit MC9 delivered from control memory MC. Control bit MC9 is a "0" when a code conversion must be performed, which limits the address under 128, or a "1" when there is no code conversion, which limits the address above 128. Memory M6 performs code conversion from the A-law in multiplex system a to the u-law in multiplex system b. That conversion concerns only the seven most significant bits of a channel. Memory M7 performs the reverse conversion, also with respect to the seven most significant bits. Therefore, the least significant bit deviated via the eighth wire in each first group does intervene in the code conversion. The bit transmits either channel data or signalling information, as previously described. The neglecting the least significant bit in the code conversion is of very little importance as far as the quality of the telephone communication is concerned. The control bit MC9 is provided because in particular cases, some of the multiplex systems a or b may have the same encoding law. Such particular cases will be considered in the following.

The previous description has considered the signalling transmitted and exchanged, as successively indicated in Tables 1 and 2. It is known that either in multiplex system a or b a common channel signalling may also be provided. In a multiplex system b, signalling information is then transmitted at a binary rate of 4 kbit/s, or a submultiple of that value, through an appropriate arrangement of the sequence of bits S different of that indicated in Table 2. In multiplex systems a, a channel needs be assigned to transmission of such a signalling information. In this case, a bit in the common channel in multiplex system b corresponds to two consecutive 8-bit words in the corresponding channel in multiplex system a. Circuit CS, shown in FIG. 9, makes it possible to perform the needed conversion bit-word and word-bit, as described in the following.

First considering the forward direction, the signalling word is stored, as a current word, in memory M1. Obviously it cannot be read out at any transfer time indicated in Table 3, because a current channel in multiplex system b would correspond to it. Therefore it is read at signalling transfer times selected among those indicated in the following Table 7.

TABLE 7

| Signalling transfer time | Number of multiplex system b |
|---|---|
| tb3ub7 | 1 |
| tb6ub7 | 2 |
| tb9ub7 | 3 |
| tb12ub7 | 4 |
| tb15ub7 | 5 |

Practically, other transfer times are available, as for instance those corresponding to tb(3j)ub7, as shown in FIG. 4 wherein those times are indicated by oblique lines extending downwardly from the upper lefthand to the lower righthand corners. The signalling transfer times indicated may be permuted, with respect to the numbers of multiplex systems b. The set of transfer time indicated in Table 7 forms signal s13, similar to signals indicated in Table 5, that are utilized in code converter CC-CS. Each of the transfer times indicated in Table 7 form signal 14 utilized in the associated parallel-serial converter MCb. Finally, the set of transfer times indicated in Table 3 plus those indicated in Table 7 form what are called "acyclic times".

Thus, at acyclic time s7, the 8-bit signalling channel word is read from memory M1 according to an address MC1-MC5 delivered from control memory MC. That word is transmitted via Lad to converters CC and CS, FIG. 9. Converter CS comprises a decoder D1 whose data input is connected from junctions Lad, in parallel with addressing input of memory M6. The data output includes two wires F5 and F6, each connected to first inputs of AND gates P12 whose outputs are connected to second inputs of OR gates P14. Wires F5 and F6 are provided for transmitting the signalling bits. Decoder D1 converts a 8-bit word into a 2-bit word transmitted via F5 and F6. Converter CS further comprises an encoder D2 whose data input is a wire F7 connected from a bit wire of backward junction Lbr. The data output is connected to first inputs of AND gates P15 whose outputs are connected to second inputs of OR gates P17. Validation of gates P12 and P15 is controlled by the previously defined control signal s13 while signal $\overline{s13}$ validates gates P13 and P16 as well as operation of memories M6 and M7.

Signalling bit delivered from decoder D1 is transmitted by wires F5 and F6, via Lbd, to wires F3 and F4, gates P6 and P7 of assembly MCb1. Gates P6 and P7 are enabled by control signals s14. First, assuming that alarm wire in Lad is at level "0" and bit MC9 is a "1", when a signalling bit detected by decoder D1 is a "1", wires F5 and F6 are activated. Gate P6 is enabled and flip-flop BS is switched to "1". When a signalling bit detected by decoder D1 is a "0", wires F5 and F6 are not activated. Gate P7 is enabled and flip-flop BS is switched to "0". When detector D1 cannot recognize the value of the signalling bit, it activates wire F6, but inhibits wire F5. Neither gate P6, nor gate P7 is turned operative and flip-flop BS keeps the condition it had in the preceding frame.

On the contrary, when alarm wire in Lad has the value "1", and bit MC9 still has the value "1", decoder D1 activates both wires F5 and F6 and causes flip-flop BS to store a failure configuration which is utilized for converting into multiplex system b and that configuration is normally transmitted by bit S. The output of decoder D1 is validated by bit MC9. When MC9 is a "0", both wires F5 and F6 are permanently inhibited regardless of the value of the signalling bit detected in decoder D1 and the condition of the alarm wire in Lad. Then, gate P7 is on and flip-flop BS is permanently in condition "0". Thus counter CP3 can deliver the multiframe alignment signal via junction Jbs4. When MC9 is a "1", assembly Msb1 does not have to be equipped, as hereinafter described, since the corresponding multiplex system b includes no associated signalling. The second input of OR gate P8 is permanently at "0" and the condition of flip-flop BS is thus transmitted via Jbs4.

In the backward direction, the signalling bit is recognized in terminal assembly Tb1 and transmitted via Jbs2 and through gate P10 that has been turned on by signal s14. The bit which is stored in register R10 in logic circuit MCb1, that would normally be transmitted via wire F7, cannot pass through gate P9 since signal s15 is not applied to second input of P9. The signal received in encoder D2 is converted into a 8-bit word that is written into memory M2, and then read out toward the concerned multiplex system a as a normal current channel word.

When terminal assembly Ta1 has detected a failure of multiplex system a by means of decoder circuit D1, it delivers a signal via wires Jas1 that is transmitted through gate P2 which has been turned on by the control signal from wires F1 and F2. The failure signal passes around memory M6 to code converter CC, then through gates P5 ORing word wires of Lbd and alarm wire. It causes register R7 to register a failure word standardized in multiplex system b which is transmitted as a current word. In the backward direction, when terminal assembly Tb1 has detected a failure of multiplex system b by means of circuit encoder D2, it delivers an appropriate signal via wire Jbs3. The failure signal passes around converter R9-R10 and inhibits gates P3 and P4 which causes memories M2 and M5 to store a failure word which is standardized in multiplex system a. Then, the failure word is transmitted as a current word. When a loss of multiframe alignment signal is detected by circuit Msb1 for the concerned multiplex system b, wire Jsba3 transmits a signal to circuit L2. Then circuit L2 may make three different decisions:

inhibition of write operation into memory M5 (the last condition stored in memory M5 before the failure remains unchanged accordingly), write "1" into memory M5, write "0" into memory M5.

The selection between those three possible operations is determined by a program according to utilization needs. When a loss of a multiframe alignment signal is detected in counter CP4 in logic circuit Msa1, it causes an appropriate information to be transmitted to circuit L3. Circuit L3 can control memories 4 in a same manner that circuit L2 controls memories M5.

When some channels of multiplex system a are not in use, the memories in circuits MCa1 and MCa4 may be initialized to avoid transmission of random words. Obviously the correspnding signalling memories must also be initialized.

The connection equipment shown in FIG. 1 makes it possible to process the most complex connecting conditions. It makes it possible to process various types of signalling:

channel associated signalling, wherein the least significant bit does not pass through memories of code converter CC, common channel signalling, as previously described in conjunction with the description of the encoder-decoder circuit CS, 64 kbit/s common channel signalling in any channel of multiplex system a or b, conversion in the code converter CC being inhibited by control bit MC9 = 1, The equipment makes it possible as well to process telephone calls which imply a code conversion with MC9 = 0, as any data without code conversion with MC9 = 1.

Figure 10:
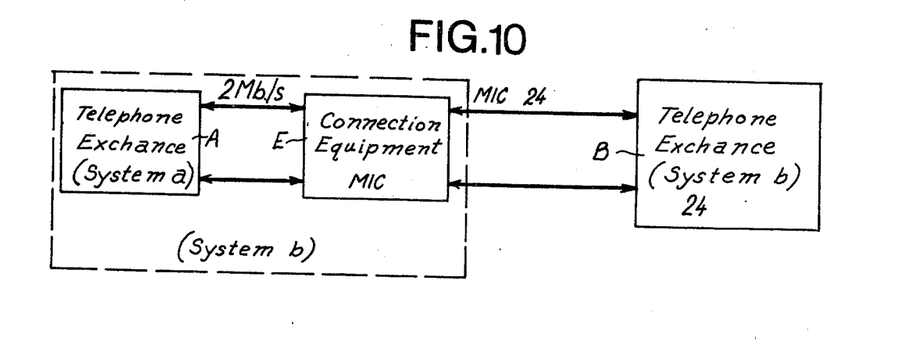
FIG. 10 is a block-diagram representation of an arrangement illustrating a particular application of a connection equipment, according to this invention.

Indeed in the most commonly occurring applications, the functions to be fulfilled by the equipment are not so numerous, particularly in the application shown in FIG. 10. The connection equipment E is a part of a time-division switching exchange A designed for switching multiplex systems a, the exchange A being located amidst a network of multiplex systems b or having numerous toll trunks toward a network of multiplex systems b, such as B.

In such a case, terminal assemblies Tsa1-Tsa4 may be deleted. Converter CC may be deleted when the encoding law is identical in the two types of multiplex systems, that is particularly the case for a time-division exchange A alone amidst a network B. Converter CS may be deleted when none of the multiplex systems include a 4-kbit/s signalling channel.

Figure 11:
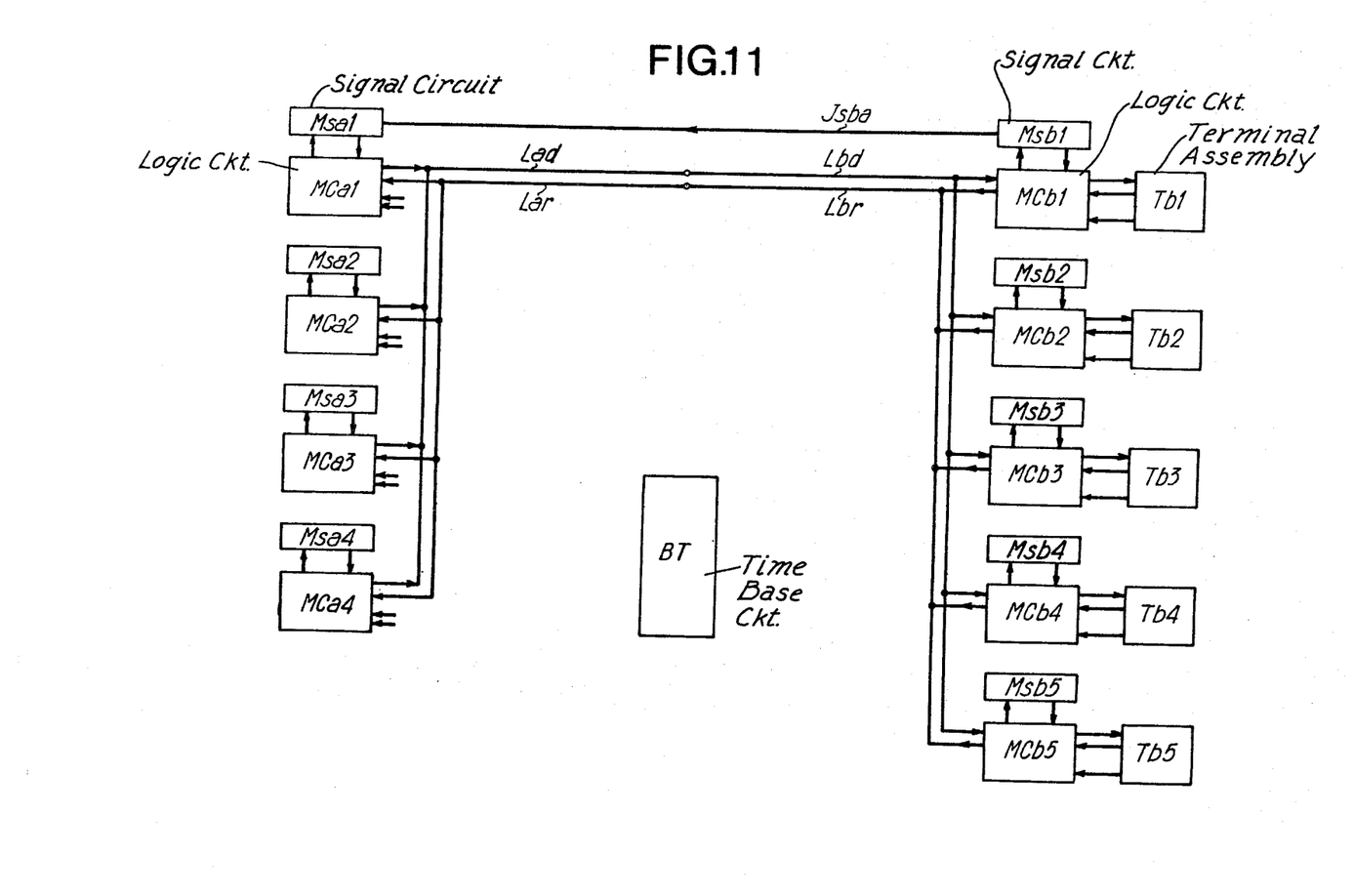
FIG. 11 is a block-diagram representation of a second embodiment of a connection equipment, according to this invention.

FIG. 11 is a block-diagram of an alternative of a connection equipment mounted in a switching exchange A installed within a network B. An assumption is made that channel associated signalling is used. Then, the connection equipment includes assemblies MCa1-MCa4, each associated to an assembly Msa2-Msa4. Converters CC and CS are deleted while Lad is directly connected to Lbd, and Lbr is directly connected to Lar.

Control memory MC is replaced by a simple time base circuit BT since those multiplex systems b which are connected to the equipment form a single trunk. The other components of the equipment shown in FIG. 1 are maintained. The operation of that alternative is easily derived from that of the equipment shown in FIG. 1, being taken into account that time base BT delivers control bits MC1-MC9, with MC8 = "1" permanently. Furthermore, the signal of wire F1 is transmitted to every assembly MCa-Msa and must have the value "0" during every time indicated in Table 7. Thus, during those transfer times, junctions Lad, Lar, Lbd and Lbr have all the value "0" and flip-flops BS in assemblies MCb are permanently in condition "0".

In a second alternative, identical to the preceding one, but needing code conversion for 64-kbit/s channels, the converter CC must be interconnected between junctions Lad and Lar, on the one hand, and junctions Lbd and Lbr, on the other hand. However junction Lid must be directly connected to Junction Lbd. Similarly junction Lir must be directly connected to junction Lar. That second alternative is not shown in the drawings.

Figure 12:
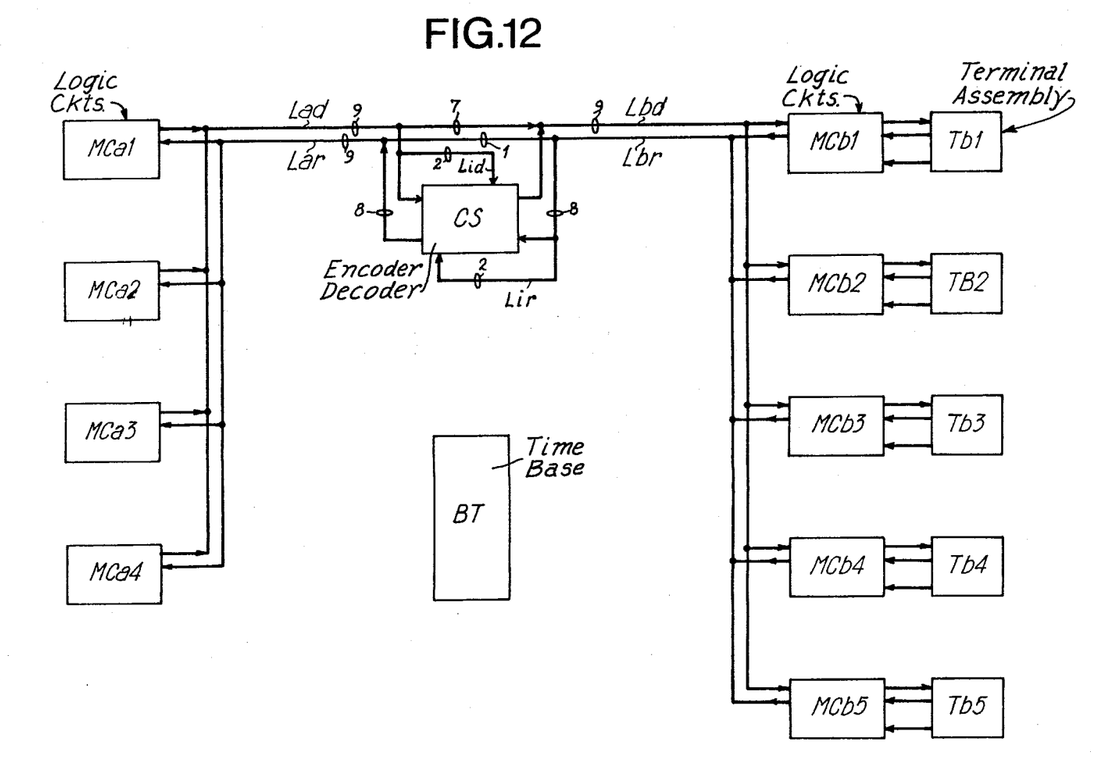
FIG. 12 is a block-diagram representation of a third embodiment of a connection equipment, according to this invention.

FIG. 12 is the block-diagram of another alternative of the equipment shown in FIG. 11, wherein signalling transmission is performed through a common 4-kbit/s signalling channel. Assemblies Msa1-Msa4 are deleted because they are only useful for a channel associated signalling; on the contrary converter CS is reinstated. Assemblies Msb1-Msb5 are also deleted. Seven wires of Lad are directly connected to the corresponding ones in Lbd, the two last wires being connected to junction Lid toward CS. Alarm wire Lbr is directly connected to the corresponding wire in Lar. The eight other wires are connected to junction Lir toward CS. Regarding time base BT, permanently MC8 = "0" and MC9 = "1".

It is obvious to people skilled in the art that the connection equipment may also be refitted being mounted within a time-division switching exchange designed for switching multiplex systems b and installed amidst a network of multiplex systems a.

It is still to be noted that instead of using serially connected forward bus junctions Jad and Jbd, and backward bus junctions Jbr and Jar, a two-way junction may be provided. Any suitable switches may be used provided, however, that the operation frequency is selected to be equal to twice the previously considered operation frequency. Thus half an acyclic bit time is utilized for the forward direction and the other half time is utilized for the backward direction.

Another alternative may also be provided wherein junction Jsba is deleted. Frame counters in Msb1-Msb5 store the complete channel associated signalling during a multiframe. But as such a signalling has to pass through assembly M5, a delay as long as 3.5 ms is introduced.

Finally, it must be understood that the pairs of registers R1-R2, R3-R4, R9-R10 constitute the serial-parallel word converters mentionned in the features stated in the preamble of the description while the pairs of registers R5-R6 and R7-R8 constitute the said parallel-serial word converters. Memories M1 and M2 are the parallel word memories, as well as M4 and M5, while memory M3 is the said serial word memory.

It is also to be noted that outputs of every memory, such as particularly those shown in FIG. 6 with gates P1 and P2 make it possible to perform the logic function OR by a simple multiple using components known in the art. Furthermore, in the description, delays due to transmissions through junctions Lad, Lar, Lbd and Lbr, and assemblies CC-CS have not been taken into account. However obviously those delays may be easily compensated by means well known to people skilled in the art.

What is claimed is:

1. A system for interconnecting two different types (a,b) of two-way multiplex systems having the same sampling frequency of recurring bit time periods, where "forward" transmission is from a to b systems and "backward" transmission is from b to a systems, said interconnecting system comprising:
   a. forward and backward terminal means in each of said two types of multiplex systems for enabling two-way transmission between any a system and any b system;
   b. each forward terminal means in an a system comprising a first serial-to-parallel word converter means connected to the input of a first parallel word memory means and first time slot counter means connected to write an addressing input into the first parallel word memory means;
   c. each backward terminal means in an a system comprising a second parallel word memory means connected to a first parallel-to-serial word converter means;
   d. each forward terminal means in a b system comprising a second parallel-to-serial word converter means;
   e. each backward terminal in a b system comprising a first serial word memory means connected to a second serial-to-parallel converter means;
   f. means effective during each recurring first time period for associating a given first a system with a given first b system, said first time periods corresponding to the bit timing in the b systems;
   g. means for selectively connecting outputs of said first parallel word memory means through forward code converter means to second parallel-to-serial word converter means during said first predetermined recurring time periods;
   h. means for selectively connecting inputs of said second parallel word memory means through backward code converter means to said second serial-to-parallel word converter means during said first predetermined recurring time periods;
   i. means responsive to said first predetermined recurring time periods for read addressing a first parallel word memory means, for write addressing a second parallel word memory means, for selecting a second parallel-to-serial word converter means and a second serial-to-parallel word converter means; and
   j. means for delivering parallel words from a first serial-to-parallel word converter means and from a second parallel word means during second predetermined recurring time periods also corresponding to the bit timing in the b systems.

2. The interconnecting system of claim 1 and
   a. third parallel word memory means connected to each first serial-to-parallel word converter means;
   b. frame counter means connected to time slot counter means, the output of said frame counter means being connected to write address said third parallel word memory means;
   c. means responsive to said time slot counter means reaching a predetermined count for validating data input to said third parallel memory means;

d. means for reading the third parallel word memory means bit by bit during third predetermined recurring time periods which are selected from among said first recurring predetermined time periods; and
e. means for substituting each bit read from the third parallel word memory for a bit read at the corresponding first predetermined recurring time period from the first parallel word memory.

3. The interconnecting system of claim 2 and
a. fourth parallel word memory means connected to the first parallel-to-serial word converter means;
b. means for writing data bit by bit into said fourth parallel word memory during fourth predetermined recurring time periods selected from among said first predetermined recurring time periods, the data applied to said fourth word memory being parts of the parallel words applied to said second word memory; and
c. means for reading out said fourth parallel memory means durng fifth predetermined recurring time periods selected from among said second predetermined recurring time periods.

4. The interconnecting system of claim 1 wherein said forward code converter means includes:
a. a direct wire connected from the input to the output of said forward code converter for transmitting the least significant bit of the applied parallel word;
b. first converting memory means for receiving other bits of the applied parallel word and for delivering the other bits of the converted word;
c. means for precluding said first converting memory means for receiving and delivering said other bits during sixth predetermined recurring time periods corresponding to bit frame times in the b systems, said sixth predetermined recurring time periods being different than said first and second predetermined recurring time frames;
d. decoder means including a flip-flop and means responsive to word signals received by said forward converter means for delivering a two-condition binary information to selectively operate said flip-flop during said sixth predetermined recurring time periods, the output of said flip-flop being transmitted as bits S through the b system during the time period when the word signals are received by said forward converter means.

5. The interconnecting system of claim 1 wherein said backward code converter means includes:
a. a direct wire connected from the input to the output of said backward converter for transmitting the least significant bit of the applied word;
b. second converting memory means for receiving and delivering the other bits of the applied word;
c. means for precluding said second converting means for receiving and delivering said other bits during seventh predetermined recurring time periods which are similar or identical to said sixth predetermined recurring time periods; and
d. encoder means for receiving some of the bits S which are transmitted through the b system and for delivering the other bits of converted parallel words.

6. The interconnecting system of claim 1 and control memory means for delivering read addresses of the first parallel word memory means and write addresses of the second parallel word memory means, the read addresses of said control memory being derived from said first perdetermined recurring time periods.

* * * * *

UNITED STATES PATENT AND TRADEMARK OFFICE
CERTIFICATE OF CORRECTION

PATENT NO. : 4,138,596
DATED : February 6, 1979
INVENTOR(S) : Alain Yves Roche

It is certified that error appears in the above-identified patent and that said Letters Patent are hereby corrected as shown below:

Col. 8, Line 31, insert --bit-- between "the" and "rate"

Col. 11, Line 13, insert --on-- between "signal" and "wire"

Col. 12, Line 60, change "27" to --s7--

Col. 14, Line 19, "1-5" s/b --1-15--

Col. 15, Line 19, "from" s/b --for--

Col. 18, Line 66, "Msa2" s/b --Msal--

Col. 19, Line 37, insert --by-- between "refitted" and "being"

Col. 11, Line 30, delete "it"

Signed and Sealed this

Thirtieth Day of October 1979

[SEAL]

Attest:

RUTH C. MASON
Attesting Officer

LUTRELLE F. PARKER
Acting Commissioner of Patents and Trademarks